June 14, 1966 J. W. MASON 3,256,024

PHONOGRAPH

Filed March 6, 1962 5 Sheets-Sheet 1

INVENTOR.

John William Mason

BY

Olson, Mecklenburger, von Holst, Pendleton & Neuman Attys

PHONOGRAPH

Filed March 6, 1962

INVENTOR.

John William Mason

BY

Olson, Mecklenburger, von Holst, Pendleton & Neuman Att'ys

June 14, 1966 J. W. MASON 3,256,024

PHONOGRAPH

Filed March 6, 1962 5 Sheets-Sheet 3

INVENTOR.

John William Mason

BY

Olson, Mecklenburger, von Holst, Pendleton & Neuman Attys

INVENTOR.
John William Mason
BY
Olson, Mecklenburger, von Holst,
Pendleton & Neuman Attys June 14, 1966 J. W. MASON 3,256,024

PHONOGRAPH

Filed March 6, 1962 5 Sheets-Sheet 5

INVENTOR.
John William Mason
BY
Olson, Mecklenburger, von Holst, Pendleton & Neuman Attys United States Patent Office 3,256,024

Patented June 14, 1966

3,256,024

PHONOGRAPH

John William Mason, Glenview, Ill., assignor to Playskool Manufacturing Company, Chicago, Ill., a corporation of Illinois Filed Mar. 6, 1962, Ser. No. 177,781
21 Claims. (Cl. 274—9)

This invention relates to a phonograph record player and more particularly to a portable phonograph, the features of which render it particularly adapted for use as an educational toy for chlidren.

The phonograph has long been recognized not only as a valuable source of entertainment but also as a very valuable and effective aid to education. Children are particularly fascinated by the phonograph and are quick to learn from the often repeated records, but the maximum in interest, entertainment and education is generally obtainable only if the child is permitted to participate with minimum supervision in the selection of the records to be played and in the actual physical operation of the phonograph. Quite often the very young child, who could greatly benefit from the educational value of the records, is barred from such unsupervised participation, because unless very closely supervised, he is apt to damage either the phonograph or the records. Moreover, because of possible danger to the child, many parents are not desirous of having the very young play with devices which depend for operation upon an electrical connection to house current.

A number of years ago there was developed what became known as the slot-type phonograph characterized by a slot in the side of the case through which a record could be inserted for play. One advantage of this type phonograph was that record play could be accomplished without opening the cabinet and exposing any of the working mechanisms such as the tone arm and the turntable However, the slot-type phonographs of previous design were completely dependent upon an external source of electrical power, and the operating mechanisms for phonographs of this type were invariably quite complex and oftimes intricate, thereby adding to the cost of manufacture and increasing the susceptibility of the unit to break down. Clearly none of the slot-type phonographs of previous design were adapted for use as educational toys for children.

It is, therefore, one object of this invention to provide a phonograph which may be employed as an educational toy for children of all ages.

It is another object of this invention to provide a quality phonograph which is completely safe and is sufficiently rugged to permit substantially unsupervised operation even by very young chlidren.

It is a further object of this invention to provide a safe, lightweight slot-type phonograph which has a minimum number of moving parts and may be operated even by very young children.

It is an additional object of this invention to provide a phonograph of high quality which is easy to manufacture and assemble, simple to operate and which requires no exterior electrical connection.

It is another object of this invention to provide a completely portable phonograph which requires no external electrical connection and is adapted to play records automatically merely upon the insertion of the record through a slot in the side of the casing.

It is an additional object of this invention to provide an inexpensive, lightweight slot-type phonograph of high quality which is easy to operate, requires no external electrical connections and is adaptable for use during travel or on outings.

It is still another object of this invention to provide a very compact portable slot-type phonograph which has no external components or controls and which may be operated by even young chlidren.

Other objects may be seen, and a further understanding of the invention may be had by referring to the following description and claims taken in conjunction with the accompanying drawings.

The phonograph constructed in accordance with one embodiment of this invention includes a turntable for supporting a record, a tone arm mounted for movement into and out of record playing relationship with respect to the turntable, a case completely surrounding the turntable and tone arm and having a slot through which records may be inserted for placement on and removal from the turntable. Means is provided within the casing for effecting desired positioning of the tone arm during insertion and removal of the record, and this tone arm positioning means constitutes one of the important features of the invention. The positioning means includes a member movable between a cocked position and a retracted position. This member is resiliently urged by suitable spring means toward its retracted position, and latch means is provided for releasably holding the member in its cocked position.

An element connected to the member is positioned for engagement by a record during insertion and is movable by the record to effect movement of the member from its retracted to its cocked position against the resistance of the spring means. A second element associated with the latch means is moved to a position for engagement by the record as the member is moved to its cocked position. This second element is movable by the record during the removal from the turntable to effect disengagement of the latch means and to permit the member to return to its retracted position under the influence of the spring means.

Means is carried by the member for swinging the tone arm upwardly and outwardly as the member is moved into its retracted position and for releasing the tone arm upon the movement of the member to its cocked position, whereupon the tone arm may gently drop into playing position at the marginal edge of a record which has been inserted through the casing and placed upon the turntable.

The turntable drive motor and audio system are preferably battery operated and are in circuit controlled by a switch. A tab on the control member opens the switch to de-energize the circuit when the member is in its retracted position, and this tab permits the switch to close to energize the circuit when the control member is moved to its cocked position. Thus, as a record is inserted, not only is the tone arm dropped into starting position on the record, but the switch is closed to energize the turntable drive motor and the audio system. A leg depending from the tone arm engages the switch and opens it when the tone arm reaches a position at the end of record play, thus, de-energizing the turntable motor and the audio system. When the record is withdrawn from the phonograph, the control member retracts and the tab thereon engages and opens the switch to again de-energize the motor and the audio system.

Figure 15:
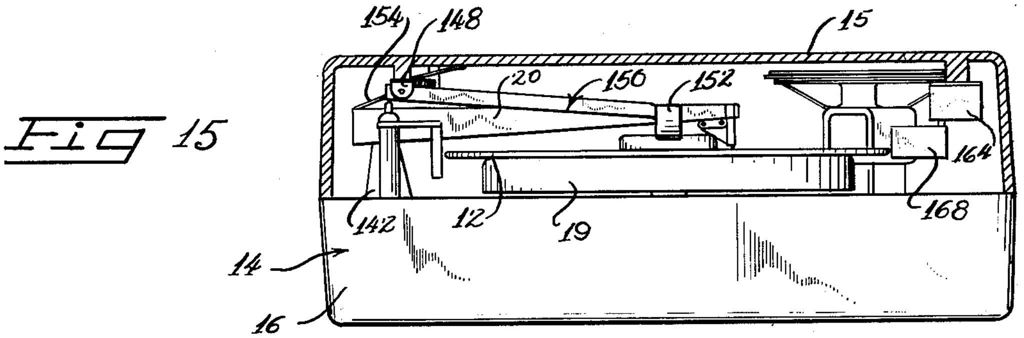
Figure 16:
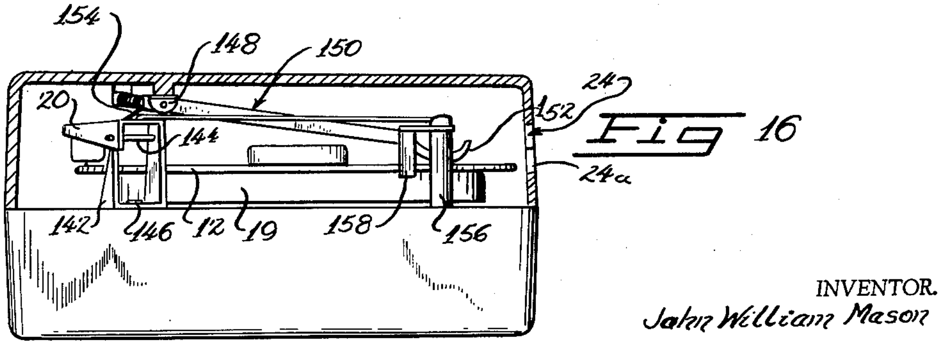

FIG .14 is a top plan view of a record player of modified design constituting another embodiment of the invention, the top section of the casing having been removed;

FIG. 15 is a front elevation view with parts removed of the modified phonograph; and FIG. 16 is a side elevation view with parts removed of the modified phonograph.

Figures 1, 2, 3:
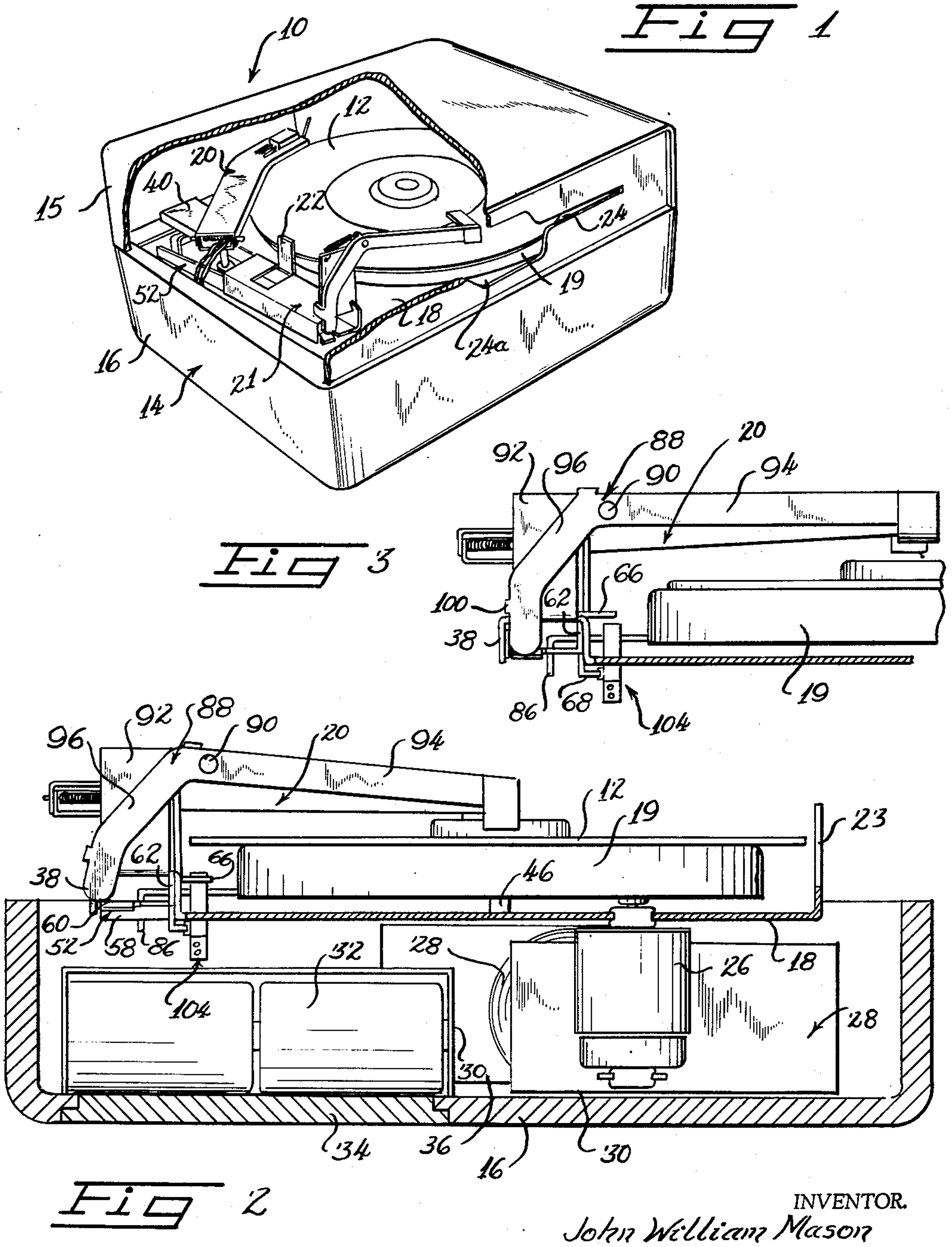
FIGURE 1 is a perspective view of a phonograph constituting one embodiment of this invention, the top section of the casing being partially broken away to reveal some of the interiorly disposed component parts.
FIG. 2 is an enlarged front elevation view of the phonograph with the top portion of the casing removed, the lower portion of the casing sectioned and with a record in playing position on the turntable.
FIG. 3 is a front elevation view of a portion of the phonograph illustrated in FIG. 2 showing the position of some of the component parts thereof after removal of the record from the turntable.

With further reference to the drawings, and more particularly to FIGS. 1 and 2, the phonograph 10 is adapted to play records 12 of a predetermined size, preferably small children's records. The phonograph has a case or cabinet 14 consisting of a hollow top section 15 and a hollow bottom section 16, the two sections being held together by suitable means such as screws or the like (not shown). Mounted across the bottom section 16 of the case is a chassis pan 18, and above the chassis pan in the area enclosed by the top section 15 of the case is a turntable 19, a tone arm 20, and means 21 for positioning the tone arm relative to the turntable in response to the placement of a record 12 thereon. Two upstanding laterally disposed record guides 22 and 23 are provided for aid in the placement of the record onto the turntable 19, and a horizontal slot 24 is formed in the front side of the case top section 15, the length of the slot being slightly greater than the diameter of the records 12 which may be played by the phonograph. The slot 24 is somewhat elevated relative to the record supporting surface of the turntable 19, and the central portion 24*a* of the slot is enlarged to facilitate insertion and removal of the record. It is preferred that the turntable be so arranged that a record in place thereon will actually project slightly through the enlarged central portion 24*a* of the slot.

Mounted below the chassis pan within the bottom section 16 of the casing is a turntable drive motor 26, an audio amplifier 28, and a battery retainer 30 adapted to hold four standard dry cell batteries 32. Access to the battery area may be obtained through a suitable door 34 in the bottom section of the case, and a screened opening 36 in the rear of the bottom section of the case permits sound transmission from the speaker 28*a* of the audio amplifier. At one side of and preferably integral with the chassis pan 18 is an inverted channel-shaped guideway 38, and partially overlying the guideway is a platform 40. A hollow tubular shaft 42 is mounted in vertical position between and extends through the guideway 38 and the platform 40, and a tone arm chair 44 is pivotally mounted for horizontal movement on the upper end of this shaft above the platform 40. The chair 44 has a depending leg 46 which extends to within close proximity of the chassis pan 18, and the tone arm 20 is pivotally connected to the chair 44 for vertical movement about the axis of a horizontal pivot pin 48, the connection being such that the axis of the tubular pivot shaft 42 intersects the tone arm between the cartridge end 20*a* thereof and the pin 48. A spring 50 wound about pin 48 operates to partially counterbalance the weight of the tone arm in the well-known manner. For purposes of this description the tone arm chair 44 may be considered part of the tone arm, for they move as a unit about the axis of pivot shaft 42 between an initial or outwardly swung position, illustrated in dotted lines in FIG. 8, and an end or inwardly swung position illustrated in solid lines. In the initial position the depending leg 46 of the chair 44 abuts the fixed platform 40 (see FIG. 9).

Figures 6, 7:
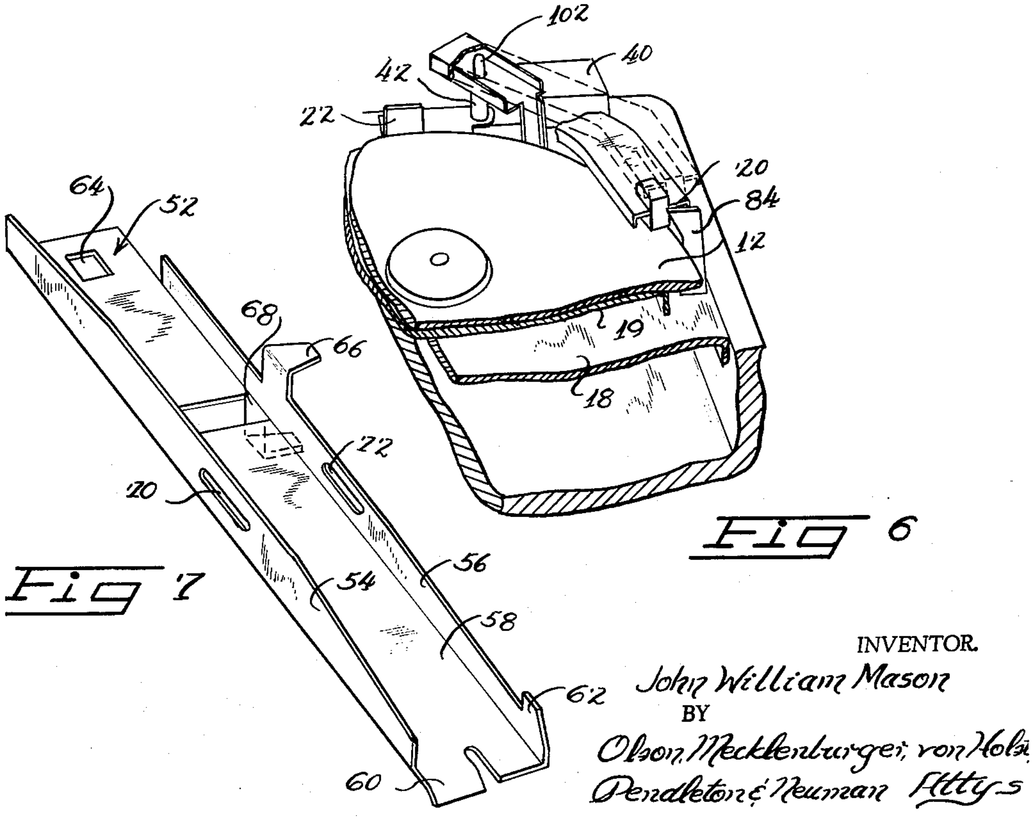
FIG. 6 is a perspective view of a portion of the phonograph showing the movement of the tone arm upon the insertion of a record.
FIG. 7 is an enlarged perspective view of the control member.

Mounted within the guideway 38 and extending rearwardly below the hollow pivot shaft 42 is an elongated control plate 52, best illustrated in FIG. 7. The control plate 52 is substantially channel-shaped and includes a pair of upstanding flange portions 54 and 56 and an intermediate web or bottom portion 58. At the forward end of the control plate part of the bottom web 58 is curved downwardly to form a cam tip 60, and the flange portions 54 and 56 each have a central section of uniform height and taper from this section toward the forward end. At the forward end of the control plate the flange 56 is provided with a projecting latch formation 62, the height of which is preferably equal to the maximum height of the flanges. A hole 64 is cut in the web 48 at the opposite end thereof from the cam tip 60, and a pair of intermediate tabs 66 and 68 project laterally from the side of the control plate at the top and bottom thereof respectively.

Slots 70 and 72 are cut in the flanges of the control plate and extend rearwardly in the central section from approximately the start of the forward taper. The control plate is mounted for limited longitudinal sliding movement within the inverted channel-shaped guideway 38 by means of a pin 74 which horizontally traverses the guideway and extends through the slots in the flanges of the control plate. The control plate thus mounted is movable between a cocked position illustrated in FIGS. 2 and 4 and a retracted position illustrated in FIGS. 3 and 5. a coil spring 76 acting between the back end of the control plate 52 and the bottom end of a leg 78 which depends from the chassis pan resiliently urges the control plate horizontally rearward toward its retracted position.

It will be noted that the control plate is releasably retained in its cocked position by the engagement of the latch formation 62 on the forward end thereof with the forward end of the guideway 38. It will also be noted that the entire control plate has tilted or pivoted slightly about pin 74 in order to effect this engagement, the tilting force being supplied by the angularly acting spring 76. The spring 76 not only urges the control plate horizontally rearwardly, but it urges the back or free end of the control plate downwardly. Since the upstanding latch formation 62 at the forward end of the control plate is approximately the same height as central sections of the flanges 54 and 56, the movement of the control plate will be maintained in a horizontal plane by the guideway until the latch formation has cleared the guideway. However, as soon as the latch formation no longer engages the roof of the guideway, the control plate is permitted to tilt until the tapered forward ends of the control plate flanges engage the guideway roof and prevent further tilting movement. This tilting movement of the control plate 52 about horizontal pin 74 is very slight, for it is limited by the amount of taper on the forward ends of flanges 54 and 56. It is sufficient to enable the latch formation 62 to engage the end of the guideway 38, and this engagement causes the control plate to be held in this forward or cocked position.

Figures 4, 5:
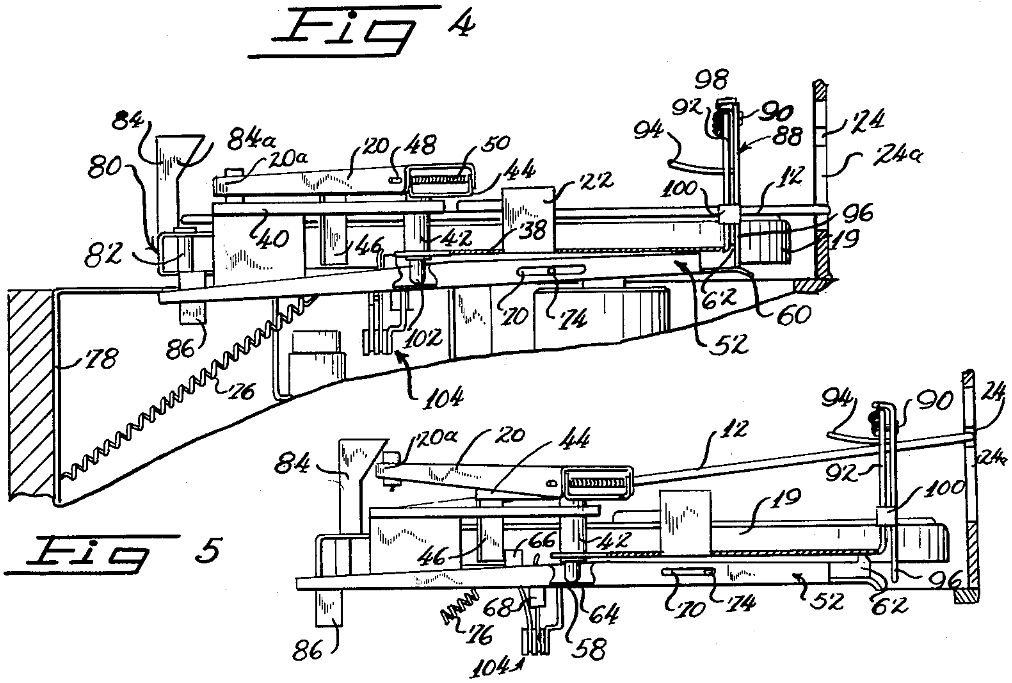
FIG. 4 is an enlarged side elevation view of portions of the phonograph showing the position of some of the component parts when a record is in playing position on the turntable.
FIG. 5 is a side elevation view of the portions of the phonograph illustrated in FIG. 8 showing the removal of the record from the turntable.

Means is provided for effecting movement of the control plate from its retracted position to its cocked position. For this purpose, a cocking lever 80 is mounted on a vertical stub shaft 82 fixed to and extending upwardly from the chassis pan 18 near the back side thereof. The cocking lever 80 has an upwardly extending record engaging arm 84 and an oppositely disposed depending arm 86 which extends through the hole 64 in the bottom web of the control plate 52 (see FIG. 7). The cocking lever 80 is, thus, movable about stub shaft 82 in the counterclockwise direction, as viewed in FIG. 8 (and to the left as viewed in FIG. 4) to effect movement of the control plate 52 from its retracted position to its cocked position. The movement of the lever 80 and the control plate 66 is accomplished by means of a record which has been inserted into the phonograph through the slot 24 and into engagement with the arm 84 of the cocking lever. The arm 84 of the cocking lever is disposed in the path of the record when the control plate 52 is in its retracted position, and in order to position the record flatly on the turntable 19 this lever must be rotated until the control plate reaches its cocked position where it is held by the engagement of the latch formation 62 with the end of the guideway 38. As illustrated in FIG. 4, when the control plate is in its cocked position the record engaging arm 84 of the cocking lever is disposed away from the edge of the record, and thus this arm will not interfere with the rotation of the record or turntable. The upper end **84*a* of the record engaging arm 84** is angularly disposed in order to prevent the record from accidentally sliding over the top thereof during insertion.

Means is also provided for disengaging the latch formation 62 and the forward end of the guideway 38 upon the removal of the record from the turntable, so that the control plate 52 may be returned to its retracted position. For this purpose, a trip lever 88 is pivotally connected by a pin 90 to a plate 92 which extends above the forward end of the guideway 38 (see FIGS. 2–4). The lever 88 has a record engaging arm 94 and an angular control plate engaging arm 96. A spring 98 acting between the lever 88 and the mounting plate 92 urges the trip lever in a counterclockwise direction toward a normal position, viewed in FIG. 2, at which time a tab 100 attached to the arm 96 abuts the mounting plate. In this normal position which is the position assumed by the trip lever when the control plate 52 is in its retracted position, the arm 94 is elevated to a level about that of the slot 24 and, thus, is out of the path of the record during insertion. It will be noted that the connection of the lever 88 to the mounting plate 92 is located such that the pivotal axis of the lever is disposed above and toward the turntable side (i.e., to the right, as viewed in FIGS. 2 and 3) of the guideway 38 and control plate 52. It will be further noted that the length of the arm 96 is such that when the lever 88 is in its normal position (see FIG. 3), the end of this arm extends slightly below the level of the control plate bottom web and in the path of the cam tip 60.

As the control plate 52 is moved toward its cocked position the cam tip 60 will engage the arm 96 and will urge this arm upwardly to effect a slight clockwise rotation of the lever 88 about the axis of pin 90. As the latch formation 62 on the control plate is moved beyond the end of guideway 38, the forward end of the control plate will swing upwardly, and cam tip 60 will force the trip lever 88 to rotate into the position illustrated in FIG. 2. In this position the free end of arm 94 is below the level of the record slot 24, and this arm must, therefore, be engaged by the record and moved upwardly toward its normal position illustrated in FIG. 3 in order to effect subsequent removal of the record from the turntable. As the trip lever is rotated by the record toward its normal position, the bottom end of arm 96 will engage the bottom web 58 of the control plate adjacent the cam tip 60, and the forward end of the control plate will be forced downwardly by arm 96 until the latch formation 62 has disengaged, whereupon the control plate 52 will be returned to its retracted position under the influence of the spring 76.

From the foregoing it is evident that the control plate 52 is moved to its cocked position by the insertion of a record and is permitted to return to its retracted position by the removal of a record. The movement of this member is utilized to effect desired positioning of the tone arm 20 and to control the operation of the turntable drive motor 26 and the audio amplifier 28. These functions are performed by means of the tabs 66 and 68 carried by the control plate and by means of a lift pin 102 supported by the control plate.

The lift pin 102 is disposed within the tubular pivot shaft 42 for vertical movement. The lower end of this pin rests upon the bottom web 58 of the control plate, and thus vertical position of the pin is dependent upon the vertical positioning of that portion of the control plate web 58 supporting the pin. The length of the pin 102 is such that when the control plate is disposed in its retracted position, the top end of the pin will engage the underside of the tone arm 20 and will support the tone arm in an elevated position out of record playing relationship with respect to the turntable 19. Since the control plate is moved to its cocked position by the insertion of a record, the elevation of the pin supporting portion of the control plate web 58 in this position must drop to a level which will permit the pin to disengage the underside of the tone arm thereby permitting the tone arm to descend into record playing relationship with respect to the turntable. In moving between its cocked and retracted positions the control plate slides below the lift pin 102; and since the control plate remains horizontal for most of this movement, the pin and tone arm will remain elevated during most of the movement. The lowering of the tone arm actually takes place during the pivotal latching movement of the control plate at the end of the movement into the cocked position, and raising occurs only during the initial pivotal unlatching movement at the beginning of the movement toward the retracted position. The latter operation permits the tone arm to be elevated as a first consequence of the removal of the record.

Control of the turntable drive motor 26 and the audio amplifier is accomplished by a normally closed switch 104 which is affixed to and extends partially through the chassis pan 18. This switch has two contacts 106 and 108. Contact 106 has a laterally extending nonconductive portion **106*a*, and contact 108 has an upwardly extending nonconductive portion 108*a***.

Figures 8, 9, 10, 11:
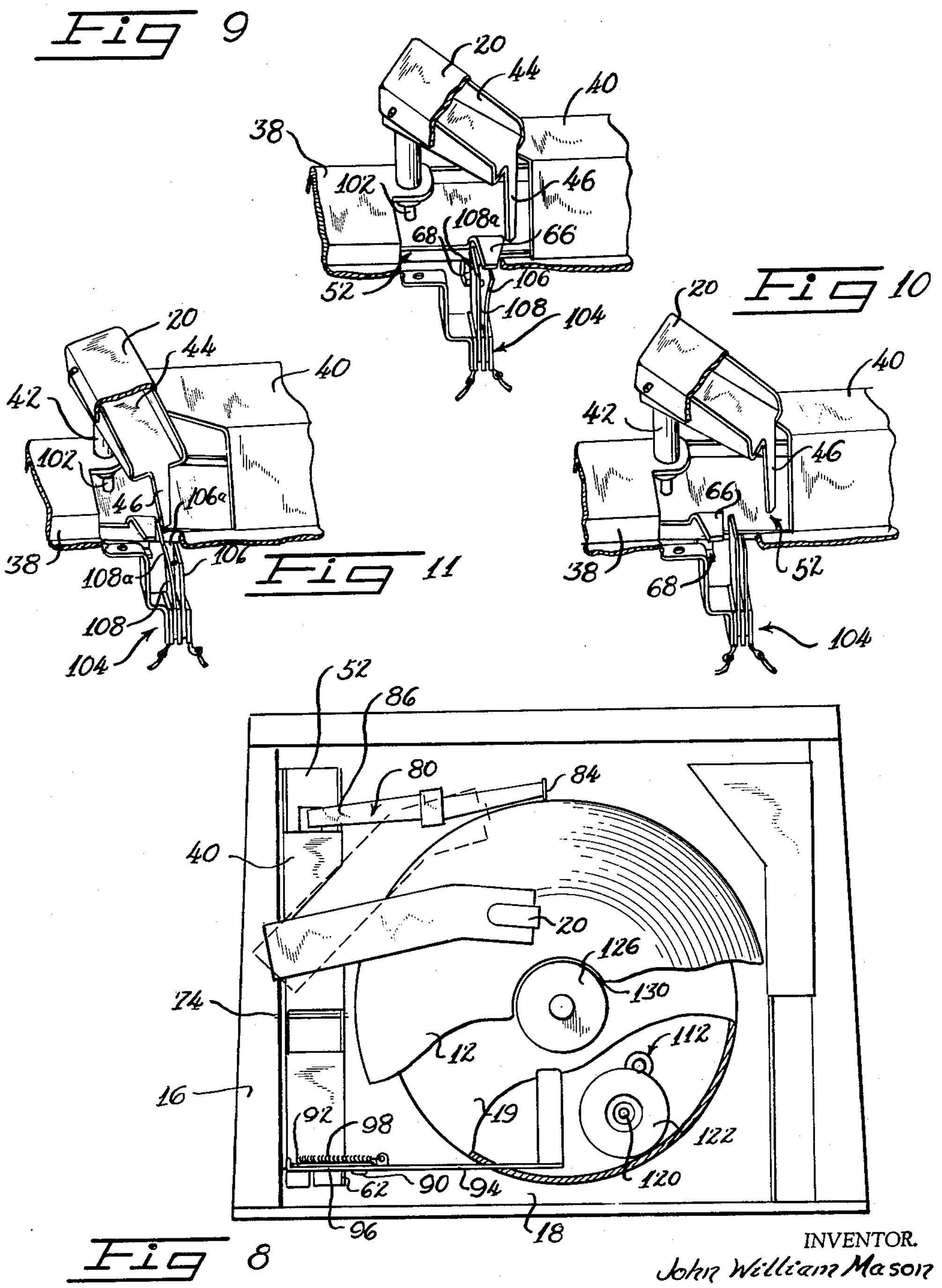
FIG. 8 is a top plan view of the phonograph with the top section of the casing removed.
FIG. 9 is a perspective view of a portion of the phonograph showing the relationship between the tone arm, the switch and the control member when there is no record in the phonograph and the control member is in its retracted position.
FIG. 10 is a perspective view of the portion of the phonograph illustrated in FIG. 5 showing the relationships between the tone arm, the switch, and the control member after a record has been inserted and the control member has been moved to its cocked position.
FIG. 11 is a perspective view of the portions of the phonograph illustrated in FIGS. 5 and 6 showing the relationship between the tone arm, the switch, and the control member after the record has been played and before it has been removed.

In FIG. 9 the control plate 52 is illustrated in its retracted position. It will be noted that when in this position tab 66 engages the depending leg 46 of the tone arm chair and forces this leg against the elevated platform 40. Thus, when the control plate is in its retracted position, the tone arm is not only elevated as previously described, but it is held in an initial outwardly swung inoperative position illustrated by broken lines in FIG. 6. In addition, when the control plate 52 is in its retracted position, the downwardly and outwardly extending tab 68 engages the nonconductive portion **106*a* of contact 106** and thus opens switch 104 to de-energize the electric circuit controlled by this switch.

In FIG. 10, the control plate 52 is illustrated in its cocked position. It will be noted that the control plate has dropped, thereby permitting the lift pin 102 to also drop, and this in turn has permitted the tone arm 20 to descend into engagement with the marginal edge of the record, as illustrated by solid lines in FIG. 6. Also, with the control plate 52 disposed forwardly in cocked position, the lower tab 68 no longer engages the switch 104, and the upper tab no longer holds the leg of the tone arm chair in an outward position against the platform 40. The tone arm 20 and tone arm chair 44 are, thus, free to pivot about the axis of the tubular shaft 42 from an initial or starting position illustrated in FIG. 10 and in dotted lines in FIG. 8 to a final or end position illustrated in FIG. 11 and in solid lines in FIG. 8. The permitted movement of the tone are is, of course, sufficient to permit the tone arm to begin and complete the play of the record.

At the end of record play the tone arm reaches the position illustrated in FIG. 11, and at this point the depending leg 46 of the tone arm chair engages the upwardly extending nonconductive portion 108*a* of contact 108 and forces this contact out of engagement with contact 90. Thus, again switch 104 is opened to de-energize the circuit controlled thereby. When the record is removed, the control plate 52, retracts to again position the tone arm and open the switch, as illustrated in FIG. 9.

Figure 13:
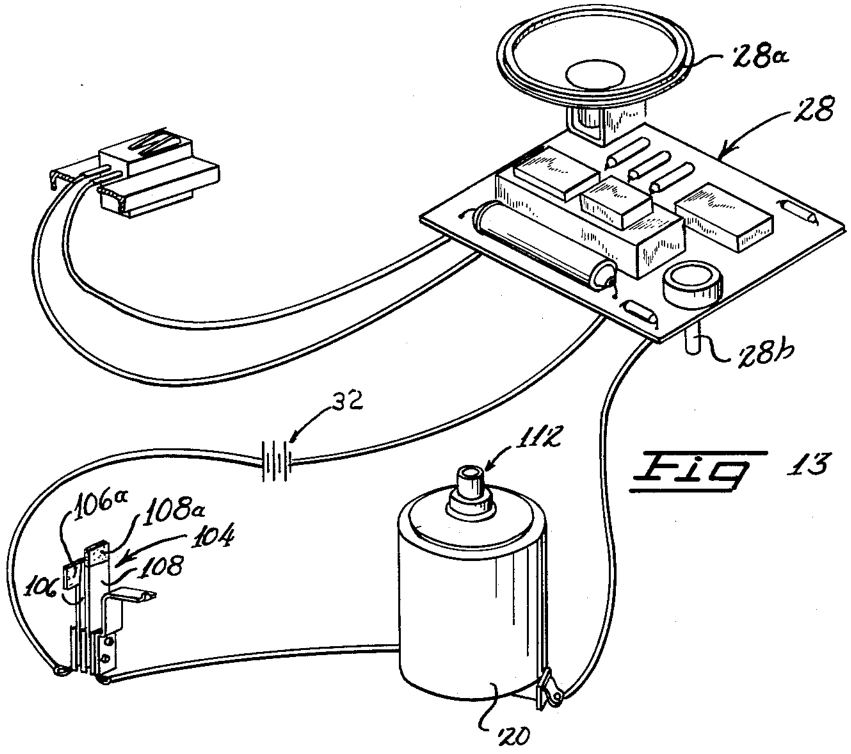
FIG. 13 is a schematic illustration of the electrical circuit including the turntable drive motor, the audio system and the control switch.

The circuit controlled by the switch 102 is schematically illustrated in FIG. 13. This switch is normally closed to energize the turntable drive motor 26 and the audio amplified 28; however, this switch is opened, and the circuit is de-energized at the completion of record play (see FIG. 11) and also upon movement of the control plate to its retracted position (see FIG. 9). While the audio amplifier circuit forms no part of the invention, it is preferred that the volume control 28*b* be adjustable by means of a screwdriver from the underside of the case. Thus, the volume may be adjusted to a level suitable to the parent and may not be changed by the child.

Figure 12:
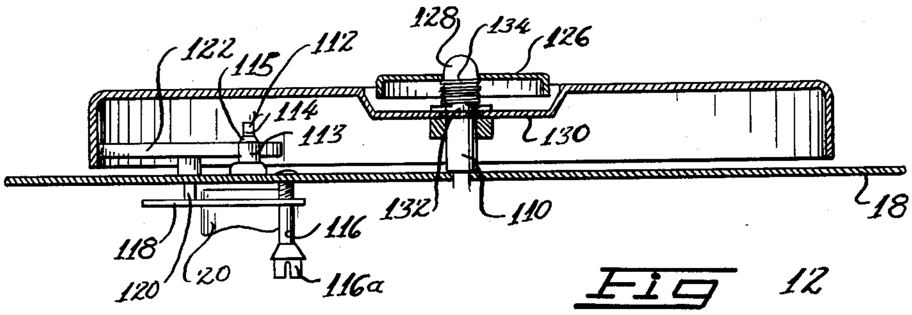
FIG. 12 is a sectional elevation view showing the turntable, the turntable drive and components of the speed changing mechanisms.

It is preferred that the phonograph be adapted for playing records of two different speeds, such as for example, 45 r.p.m. and 33⅓ r.p.m. records. The means for accomplishing this is best illustrated in FIGS. 8 and 12. The turntable 19 is journalled for free rotation on a shaft 110 fixed to and extending upwardly from the chassis pan 18. The turntable drive motor 20 is mounted on the underside of the chassis pan 18, and the drive shaft thereof extends upwardly through an aperture in the chassis pan below the turntable. Mounted on the shaft of this drive motor 20 above the chassis pan 18 and below the turntable is a roller 112. This roller has a lower portion 113 of relatively large diameter an upper end portion 114 of relatively small diameter and a tapered intermediate portion 115.

Journalled in and depending from the chassis pan 18 adjacent the motor 20 is a shaft 116 which is threaded adjacent its journalled upper end and has a screw head formation 116*a* adjacent its free end for facilitating the manipulation thereof by means of a screwdriver through the underside of the case. Carried on the threaded part of the shaft 116 is a plate 118 which has a stub shaft 120. This stub shaft extends through an aperture in the chassis pan 18, and journalled on the end of this stub shaft below the turntable is a drive wheel 122. A spring 124 acting between the chassis pan 18 and the plate 118 urges the plate, the stub shaft 120 and the drive wheel 122 about the axis of shaft 118 in a direction which will cause the drive wheel to resiliently engage both the interior surface of the turntable 19 and the surface of the drive roller 112. By the manipulation of the shaft 116, the plate 118 may be moved between a lowered position, wherein the drive wheel 122 engages the lower portion 113 of roller 112, and an elevated position, wherein the drive wheel 122 engages the upper portion 114 of the drive roller. The tapered intermediate portion 115 facilitates this vertical movement of the drive wheel 122 between its positions in engagement with the drive roller 112. The peripheral driving and driven surfaces of the drive roller, the drive wheel and the turntable are preferably such that when the drive wheel is in its lowered position engaging the lower portion 113 of the drive roller, the turntable 19 will be rotated at a speed of approximately 45 r.p.m., whereas when the drive wheel 122 is engaging the upper portion 114 of the drive roller, the turntable will be rotated at a speed of approximately 33⅓ r.p.m.

Since the phonograph is to be adapted for playing both 45 and 33⅓ r.p.m. records, the center openings of which differ in size, means should be provided for accommodating these different size center openings. One method of accomplishing this is by means of a plug 126 adapted to fit the center hole in 45 r.p.m. records and having a central protuberance 128 adapted to fit the center hole in 33⅓ r.p.m. records. The plug 126 is mounted for limited vertical movement within a central recess 130 in the turntable on a shaft 132 fixed to the turntable. A light spring 134 urges the plug upwardly on the shaft 132 to the position illustrated in FIG. 12. When a 45 r.p.m. record having a relatively large center hole is placed on the turntable, the plug 126 will extend through the center hole in the usual manner; however, when a 33⅓ r.p.m. record is placed on the turntable and centered on the protuberance 128, the weight of the record will bear upon the plug 126; and the light spring 134 will permit the plug 126 to move downwardly under the weight of the record until the record engages the surface of the turntable.

The operation of the phonograph is as follows:

With no record on the turntable, the control plate 52 is in its retracted position and is horizontally orientated. In this position of the control plate, the lift pin 102 is in its elevated position, and the tab 66 engages the depending leg 46 of the tone arm chair, thus, causing the tone arm 20 to be elevated and to be moved into and maintained in an inoperative outwardly swung position. Also, while in this position, the tab 68 on the control plate is in engagement with and holds open the normally closed switch 104 to de-energize the electrical circuit through the turntable drive motor 20 and the audio system 28. Upon the insertion of a record through the slot in the case and onto the turntable 19, the forward edge of the record will engage the upstanding arm 84 of the cocking lever 80, and the cocking lever will be rotated to force the control plate forward until the latch formation 62 thereon passes and engages the forward end of the guideway 38. As this occurs, the control plate will tip or pivot slightly about pin 74 under the influence of spring 76 as permitted by the taper of the control plate flanges. The upward movement of the forward end of the control plate cams the trip lever 88 into position for engagement by a record upon removal, and the downward movement of the back part of the control plate permits the lift shaft 102 to move downwardly, thus, permitting the tone arm to descend into engagement with the record on the turntable.

The movement of the control plate 52 to its cocked position also causes the tab 68 to disengage from the switch 104 and moves the tab 66 from holding engagement with the depending leg 46 of the tone arm chair. Thus, the switch 104 is permitted to close to energize the turntable motor and the audio system, and the tone arm 20 which has been lowered into engagement with the record is permitted to move horizontally under the influence of the convoluted groove in the record. At the end of record play when the tone arm approaches the center of the record and turntable, the depending leg 46 of the tone arm chair engages the switch 104 and again de-energizes the turntable motor and audio amplifier.

In order to withdraw the record, the end thereof extending through the aperture 24*a* in the case must be raised to the level of the slot 24. In this movement the record will engage arm 94 of the trip lever, and the trip lever will be rotated until the arm 96 cams the forward end of the control plate downwardly to an extent sufficient to permit the latch formation 62 to pass through the guideway 38. As the forward end of the control plate is cammed downwardly, the back end of the plate is raised causing the lift pin 102 supported thereon to effect raising of the tone arm 20. As soon as the control plate has been pivoted enough to disengage the latch formation 62 from the forward end of the guideway and permit this formation to pass through the guideway, the spring 76 effects return of the control plate to its retracted position. As the control plate returns to its retracted position, the pin 102 and tone arm 20 will be held in elevated position, and the tab 66 on the control plate will engage the depending leg of the tone arm chair and swing the now elevated tone arm to its outermost position above the peripheral margin of the record to be played in the phonograph whereupon the leg 46 will engage the fixed platform 40. At the same time, the tab 68 again engages the switch 104 to de-energize the turntable drive motor and audio amplifier.

It will be readily apparent that although many advantages are obtained with the described structure, many modifications are possible. For example, the structure and movement of the control plate or member could be changed somewhat without materially affecting the function and operation thereof. It is desired to have the cocking element near the rear of the phonograph and the trip element near the slotted front, although these elements could be centrally located if desired. The important consideration is that the control member be moved to one position upon insertion of a record and another position upon removal of a record. The movement should be such that upon movement on this member to one position an element such as the lift pin 102, carried by or supported by the control member be moved to effect raising of the tone arm and that an element such as the tab 68 be moved to effect outward swinging of the tone arm to an initial horizontal position. The raising of the tone arm should, of course, precede the outward swinging thereof to avoid damage to the record. Release of the tone arm by these elements should then be accomplished by movement of the tone arm to its other position.

Figure 14:
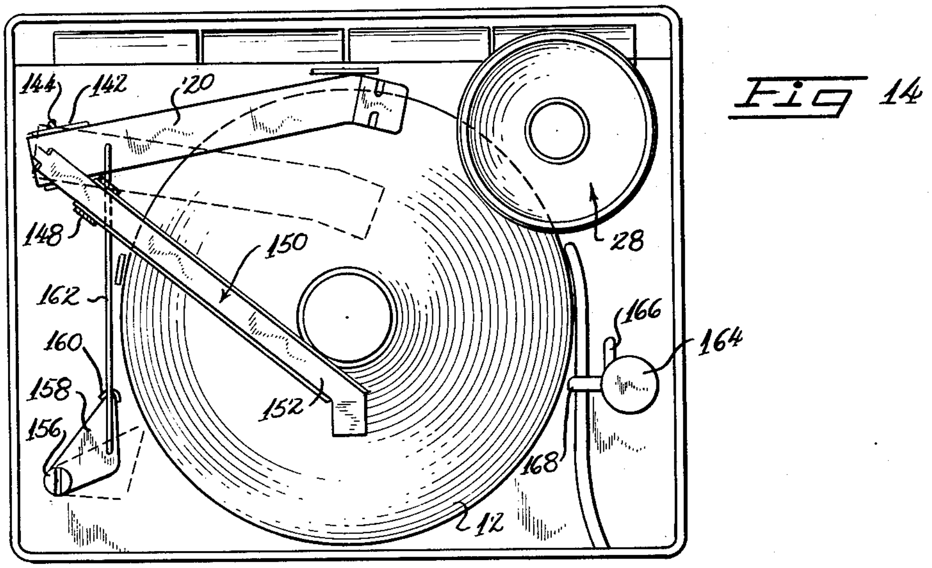

A phonograph of slightly modified design is illustrated in FIGS. 14, 15 and 16. This phonograph employs the same audio amplifier 28, turntable 19, tone arm 20 and slotted case 14, as the previously described embodiment. The tone arm 20 in this embodiment is mounted on a trunnion bracket 142 by means of a horizontal shaft 144, and the trunnion bracket is pivotally mounted to the chassis pan by means of a vertical pin 146 (see FIG. 16). Thus, the tone arm 20 and trunnion bracket 142 may be swung horizontally about the axis of pin 146, and the tone arm may be pivoted vertically about the axis of trunnion shaft 144. Pivotally mounted in a bracket 148 attached to the top section 15 of the case is a lever 150, one arm 152 of which extends forwardly over the turntable 19 to a point between the slot 24 in the front of the case and the center of the turntable. The opposite arm 154 of the lever 150 extends downwardly and engages the tone arm to the rear of the horizontal trunnion shaft 144. Thus, raising of the arm 152 results in lowering of the arm 154, and this in turn effects raising of the tone arm 20.

Mounted on a shaft 156 at one side of and toward the front of the phonograph is a pivot plate 158 having a depending record engaging cam portion 160, and a link 162 extends between and interconnects the pivot plate 158 and the tone arm 20. Thus, horizontal movement of the pivot plate 158 about the axis of the shaft 156 will result in a corresponding movement of the tone arm 20 about the axis of the pin 146 connecting the tone arm trunnion to the chassis. The relative positions of the tone arm 20 and the plate are illustrated in solid and broken lines in FIG. 14.

On the opposite side of the chassis slightly forward of the turntable center is a toggle switch 164 which controls the audio amplifier 28 and the turntable drive motor, as did switch 104 in the previous embodiment. Switch 162 is suspended from the top section 15 of the case and is operated by a pair of arms 166 and 168. The arms 166 and 168 are fixed to the operating shaft of the toggle switch; and in the closed position of the switch, wherein the electrical circuit is energized, the arm 168 is disposed in and extends normal to the path of record insertion and removal. The arm 166 on the other hand is disposed parallel to and out of the path of record insertion and removal when the switch is "closed."

In the open position of the switch 164, wherein the electrical circuit is de-energized, the arms 166 and 168 are rotated counterclockwise from the position illustrated in FIG. 14. This orients arm 166 normal to the path of record insertion and removal and positions the tip of this arm in the record path. The arm 168 will, however, in this position of the switch be positioned parallel to and out of the record path. From this it may be seen that as a record is inserted, arm 166 will be engaged, and this arm will be moved clockwise to the position illustrated in FIG. 14, thus, energizing the turntable drive motor and audio amplifier. When the record is subsequently removed, arm 168 will be engaged and rotated in the counterclockwise direction to open the switch and de-energize the electrical circuit.

The operation of this phonograph is, therefore, as follows:

When a record is inserted through the slot 24 in the front of the case the arm 152 of the lever 150 will be engaged and raised to effect corresponding raising of the tone arm 20. Should the tone arm be in other but its outwardly swung position, the record will engage the depending cam portion 160 of the plate 158. The plate will be cammed to the position illustrated in solid line in FIG. 14, and this will result in the tone arm 20 being moved to its outwardly swung position, also as illustrated in solid lines. As the positioning of the tone arm takes place, the record moves into engagement with the switch arm 168 and sweeps this arm in the clockwise direction, as viewed in FIG. 14, to the position illustrated to energize the circuit in which the turntable motor and audio amplifier are located, and the record is permitted to play. After the record has played through, it is removed by first raising the outer end of the record to the level of the slot 24. In this initial movement, the record will engage the arm 152 thus raising the tone arm 20 from engagement with the record. As the record is withdrawn from the phonograph, it will sweep the arm 168 of the switch and rotate this arm to open the switch and de-energize the electrical circuit. At the same time the record will engage the cam portion of the plate 158 camming the plate and the tone arm to their outward positions in preparation for the insertion and play of the next record. In this outward position the tone arm is lowered behind and below the level of the turntable 19.

It may be seen that a phonograph constructed in accordance with this invention is ideal as a quality educational toy for children, for it is safe, easy to operate and sufficiently rugged to permit substantially unsupervised operation even by very young children. Moreover, such a phonograph is lightweight, compact and completely portable.

Although the invention has been described with a certain degree of particularity, it is understood that the present disclosure has been made only by way of example and that many modifications and changes in various details may be resorted to without departing from the spirit and scope of the invention, as hereinafter claimed.

What is claimed is:

1. In a record player, a turntable for supporting a record, a tone arm mounted for vertical and horizontal movement, a case surrounding said turntable and tone arm and having a slotlike opening located slightly above the record supporting surface of the turntable through which records may be passed for placement upon and removal from the turntable, and tone arm positioning means including a movable element mounted above the level of the turntable and adapted to be engaged and raised by a record during the removal thereof from the turntable, whereby as said element is raised by a record during removal said tone arm may be raised out of engagement with the record.

2. In a record player, a turntable for supporting a record, a tone arm mounted for vertical and horizontal movement, a member movable between two positions, means in operative association with said member and engageable with said tone arm to move said tone arm into and hold said tone arm in an elevated and outwardly swung position when said member is in one of said positions and effective to release said tone arm when said member is in the other of said positions whereby said tone arm may move into record playing relationship with respect to said turntable, means responsive to the placement of a record on said turntable for effecting movement of said member to said other position, and means responsive to the removal of a record from the turntable for effecting movement of said member to said first position.

3. In a record player, a turntable for supporting a record, a tone arm mounted for vertical and horizontal movement, a member movable between two positions, means in operative association with said member and engageable with said tone arm to move said tone arm into and hold said tone arm in an elevated and outwardly swung position when said member is in one of said positions and effective to release said tone arm when said member is in the other of said positions whereby said tone arm may move into record playing relationship with respect to said turntable, a first element in operative engagement with said member and positioned for engagement by a record during placement thereof onto the turntable, whereby said member may be moved to said other position, and a second element in operative engagement with said member when said member is in said other position and positioned for engagement by a record during removal thereof from said turntable, whereby said member may be moved to said one position.

4. The structure of claim 3 wherein said first element is held out of record engaging position when said member is moved to said other position, and said second element is held out of record engaging position when said member is moved to said one position, whereby said first element may be engaged by the record only during placement thereof onto the turntable and said second element may be engaged by the record only during removal thereof from the turntable.

5. In a record player, a turntable for supporting a record, a tone arm mounted for vertical and horizontal movement, a case surrounding said turntable and tone arm and having a slotlike opening through which records may be passed for placement upon and removal from the turntable, a first element mounted for engagement by a record during placement thereof onto the turntable, a second element mounted for engagement by a record during removal thereof from the turntable, and tone arm positioning means responsive to said first element for effecting movement of said tone arm from an initial inoperative position to an initial record playing position upon the placement of a record onto said turntable and responsive to said second element for effecting return movement of said tone arm into said initial inoperative position upon the removal of the record from the turntable.

6. In a record player, a turntable for supporting a record, a tone arm mounted for vertical and horizontal movement, a case surrounding said turntable and tone arm and having a slotlike opening through which records may be passed for placement upon and removal from the turntable, a member movable between two positions, a first element operatively connected to said member and positioned for engagement by an inserted record when said member is in one of said positions, whereby said member may be moved to the other of said positions, a second element in operative engagement with said member and positioned for engagement by a record when said member is in the other of said positions, whereby said member may be returned to said one position upon removal of a record from the turntable, means operatively engaging said member for effecting movement of said tone arm into an initial inoperative position as said member is moved to said one position and adapted to release said tone arm upon movement of said member to said other position, whereby said tone arm may move to an initial playing position upon the placement of a record onto said turntable and may be returned to an initial inoperative position upon the removal of a record from said turntable.

7. In a record player, a turntable for supporting a record, a tone arm mounted for vertical and horizontal movement, a case surrounding said turntable and tone arm and having a slotlike opening through which records may be passed for placement upon and removal from the turntable, a member movable between two positions, means in operative association with said member and engageable with said tone arm to move said tone arm into and hold said tone arm in an elevated and outwardly swung position when said member is in one of said positions and effective to release said tone arm when said member is in the other of said positions whereby said tone arm may move into record playing relationship with respect to said turntable, a first element operatively connected to said member and positioned for engagement by a record during placement thereof onto the turntable, whereby said member may be moved to said other position, and a second element in operative engagement with said member when said member is in said other position and positioned for engagement by a record during removal thereof from said turntable, whereby said member may be moved to said one position, said second element being normally positioned out of record engaging position and being moved into position for record engagement by said member as said member is moved into said other position, said first element being held out of record engaging position by said member when said member is in said other position and being moved into position for record engagement by said member as said member is moved into said one position.

8. In a record player, a turntable for supporting a record, a tone arm mounted for vertical and horizontal movement, a member movable between a cocked and a retracted position, means resiliently urging said member toward its retracted position, means for effecting movement of said member to its cocked position as a record is positioned on said turntable, latch means for releasably retaining said member in its cocked position and responsive to the removal of a record from said turntable to effect release of said member, whereby said member may be returned to its retracted position under the influence of said resilient means, and means operatively connected to said member for effecting movement of said tone arm into an initial inoperative position as said member is moved to said retracted position and adapted to release said tone arm upon movement of said member to said cocked position, whereby said tone arm may move to an initial playing position upon the placement of a record onto said turntable and may be returned to an initial inoperative position upon the removal of a record from said turntable.

9. In a record player, a turntable for supporting a record, a tone arm mounted for vertical and horizontal movement, a case surrounding said turntable and tone arm and having a slotlike opening through which records may be passed for placement upon and removal from the turntable, a tone arm engaging element mounted for movement in one direction to effect raising of said tone arm and in the opposite direction to permit lowering of said tone arm, a member mounted for movement adjacent one end of said element along a path between two positions, the first portion of said path extending generally in said one direction, and the remainder of said path extending transverse to said one direction, whereby as said member is moved along the first portion of said path said element will be moved in said one direction to effect raising of said tone arm, and said tone arm will remain in raised position as said member is moved along the second portion of said path, means carried by said member for engaging and moving said raised tone arm to an initial inoperative position as said member is moving along the second portion of said path, means responsive to the placement of a record onto said turntable for effecting movement of said member to said other position, and means responsive to the removal of a record from the turntable for effecting movement of said member to said first position.

10. In a record player, a turntable for supporting a record, a tone arm mounted for vertical and horizontal movement, a case surrounding said turntable and tone arm and having a slotlike opening through which records may be passed for placement upon and removal from the turntable, a tone arm engaging element mounted for vertical movement to effect raising and lowering of said tone arm, a member mounted for movement below said element along a path between a retracted and a cocked position, the first portion of said path leading into said cocked position extending generally in the vertical direction, and the second portion of said path leading into said retracted position extending generally in the horizontal direction, whereby as said member is moved from said cocked position along the first portion of said path said element will be moved in the vertical direction to effect raising of said tone arm and said tone arm will remain raised as said member is moved along the second portion of said path to its retracted position, a first element operatively connected to said member and positioned for engagement by an inserted record when said member is in its retracted position, whereby said member may be moved to its cocked position, means resiliently urging said member in a horizontal direction toward said retracted position and in a vertical direction toward said cocked position, a second element in operative engagement with said member and positioned for engagement by a record when said member is in its cocked position, whereby said member may be moved in the vertical direction by said element and may be returned to its retracted position by said resilient means, and means carried by said member for engaging said tone arm after the latter has been raised and for swinging said tone arm outwardly to a position above initial record playing position.

11. In a record player, a turntable for supporting a record, a tone arm mounted for vertical and horizontal movement, a case surrounding said turntable and tone arm and having a slotlike opening through which records may be passed for placement upon and removal from the turntable, a member mounted for limited substantially horizontal movement from a retracted position and for limited pivotal movement about an intermediate substantially horizontal axis, guide means preventing pivotal movement of said member until said member has substantially reached the limit of its horizontal movement in the direction away from said retracted position, whereupon said member may be pivoted into a cocked position, means resiliently urging said member toward its retracted position and urging pivotal movement of said member, a tone arm lift element operatively engaging said member and movable in the vertical direction by said member to effect raising and lowering of said tone arm, said element being held in tone arm raising position by said member when said member is in its retracted position and during movement of said member in a substantially horizontal direction, said element being movable with said member to permit lowering of said tone arm when said member is pivoted into its cocked position, a first element operatively connected to said member and positioned for engagement by an inserted record when said member is in its retracted position, whereby said member may be moved to its cocked position, a second element in operative engagement with said member and positioned for engagement by a record when said member is in its cocked position, whereby said member may be pivoted from the cocked position and may be returned to its retracted position by said resilient means, and means carried by said member for engaging said tone arm after the latter has been raised and for swinging said tone arm outwardly to a position above initial record playing position as said member is moved to its retracted position.

12. The structure of claim 11 including an audio amplifier controlled by said switch and energized and de-energized simultaneously with said motor.

13. In a record player, a turntable for supporting a record, a tone arm mounted for vertical and horizontal movement, a case surrounding said turntable and tone arm having a slotlike opening through which records may be passed for placement upon and removal from the turntable, a control member mounted for movement between a cocked and a retracted position, means resiliently urging said member into retracted position, latch means for releasably retaining said member in its cocked position, means operatively connected to said member for effecting movement of said tone arm into an initial inoperative position as said member is moved to said retracted position and for effecting release of said tone arm upon movement of said member to said cocked position, a cocking lever in engagement with said member and arranged for engagement by a record during placement thereof onto the turntable, whereby said lever may be moved by an inserted record to effect movement of said member to its cocked position, a trip lever movable into position for engagement by a record upon removal when said member is moved to its cocked position, said lever being movable by a record upon removal to effect disengagement of said latch means, whereby said member may be returned to its retracted position.

14. In a record player, a turntable for supporting a record, a tone arm mounted for vertical and horizontal movement, a motor operable to drive said turntable, a case surrounding said turntable and tone arm and having a slotlike opening through which records may be passed for placement upon and removal from the turntable, a first element mounted for engagement by a record during placement thereof onto the turntable, a second element mounted for engagement by a record during removal thereof from the turntable, tone arm positioning means responsive to said first element for effecting movement of said tone arm from an initial inoperative position to an initial record playing position upon the placement of a record onto said turntable and responsive to said second element for effecting return movement of said tone arm into said initial inoperative position upon the removal of the record from the turntable, switch means responsive to said positioning means and to said tone arm movement to effect energizing of said motor as said tone arm is moved to said initial record playing position and to effect de-energizing of said motor when said tone arm approaches the center of said turntable at the end of record play.

15. In a record player, a turntable for supporting a record, a tone arm mounted for vertical and horizontal movement, a motor operable to drive said turntable, a switch for controlling said motor, a case surrounding said turntable and tone arm having a slotlike opening through which records may be passed for placement upon and removal from the turntable, a control member mounted for movement between a cocked and a retracted position, means resiliently urging said member into retracted position, latch means for releasably retaining said member in its cocked position, means operatively connected to said member for effecting movement of said tone arm into an initial inoperative position as said member is moved to said retracted position and for effecting release of said tone arm upon movement of said member to said cocked position, means on said member for engaging said switch whereby said switch may be opened to de-energize said motor when said member is in its retracted position and may be closed when said member is in its cocked position, means on said tone arm for engaging and opening said switch to de-energize said motor as said tone arm approaches the center of said turntable at the end of record play, a cocking lever in engagement with said member and arranged for engagement by a record during placement thereof onto the turntable, whereby said lever may be moved by an inserted record to effect movement of said member to its cocked position, and a trip lever movable into record engaging position when said member is moved to its cocked position, said lever being movable by a record upon removal to effect disengagement of said latch means, whereby said member may be returned to its retracted position.

16. The structure of claim 15 including an audio amplifier controlled by said switch, whereby said switch may effect energizing of said audio amplifier as said member is moved to its cocked position and may effect de-energizing of said audio amplifier when said tone arm approaches the center of said turntable at the end of record play and again when said member is moved to its retracted position.

17. In a slot-type, record player, a turntable for supporting a record, a tone arm mounted for vertical and horizontal movement and having a projecting formation horizontally movable therewith, stop means for said tone arm, a member movable between a cocked and retracted position and having a projection thereon adapted to engage and move the formation on said tone arm into engagement with said stop means as said member is moved to its retracted position, means for resiliently urging said member toward its retracted position, means responsive to the insertion of a record to effect movement of said member to its cocked position, latch means for releasably retaining said member in its cocked position, and trip means having an element movable into position for engagement by a record upon the removal thereof from said turntable, said trip means being responsive to the engagement of said element by the record upon removal to effect release of said member by said latch means whereby said member may move to its retracted position, and means in association with said member for raising said tone arm as said member is moved from its cocked position into its retracted position.

18. In a slot-type record player, a turntable for supporting a record, a roller, means for effecting rotation of said drive roller at a constant speed, said roller having a first cylindrical section, a second cylindrical section of substantially larger diameter than said first section drive surface, and a tapered intermediate section disposed between said first and second sections, an idler wheel, means resiliently urging said idler wheel into engagement with said roller and said turntable, and adjustable means for effecting movement of said idler wheel between a first position wherein said wheel is in engagement with the first section of said drive roller and a second position wherein said wheel is in engagement with the second section of said drive roller, whereby the speed of said idler wheel and said turntable may be regulated.

19. In a record player, a turntable for supporting a record, a tone arm mounted for vertical and horizontal movement, a case surrounding said turntable and tone arm and having a slotlike opening through which records may be passed for placement upon and removal from the turntable, a first element in engagement with said tone arm and extending over said turntable and in front of said slotlike opening, said first element being movable away from said turntable to effect raising of said tone arm during the insertion and removal of a record, a second element operatively connected to said tone arm and positioned for engagement by a record upon insertion and removal when said tone arm is in other than an initial outwardly swung position, said second element being movable by a record upon insertion and removal thereof to effect movement of said tone arm to said initial position.

20. The structure of claim 19 including a motor operable for driving said turntable, a toggle switch for controlling said motor, said switch being mounted at one side of said turntable and having a pair of record engaging arms disposed substantially perpendicular to each other, one of said arms extending toward said turntable for engagement by a record when said switch is open and being movable by a record during insertion to effect closing of said switch and to effect movement of the other arm to a position wherein it extends toward said turntable, whereby as a record is inserted said turntable motor may be energized, said other arm being movable by a record during removal to effect opening of said switch and to effect movement of said one arm to its initial position extending toward said turntable, whereby as a record is removed said turntable motor may be de-energized.

21. In a slot-type record player having a turntable, guide means aligned with said turntable for guiding a record along a predetermined path as it is being placed onto and removed from said turntable, a control switch for at least one electrically-operated component of the player, said switch being mounted at one side of said guide means and having a pair of record-engaging arms disposed in relative transverse relationship with respect to one another, one of said arms being disposed in said predetermined path for engagement by a record when said switch is open and being movable by a record during insertion to effect closing of said switch and to effect positioning of the other arm in said predetermined path, whereby as a record is inserted said electrically-operated component may be energized, said other arm being movable by a record during removal to effect opening of said switch and to effect positioning of said one arm in said predetermined path, whereby as a record is removed said electrically-operated component may be de-energized.

References Cited by the Examiner

UNITED STATES PATENTS

| | | | |
|---|---|---|---|
| 2,100,686 | 11/1937 | Collaro et al. | 274—2 |
| 2,241,013 | 5/1941 | Gay | 274—9.1 |
| 2,485,575 | 10/1949 | Deaver | 274—9 |
| 2,508,715 | 5/1950 | Harman | 274—9 |
| 2,508,845 | 5/1950 | Thompson | 274—9 |
| 2,525,926 | 10/1950 | Matthews | 274—9 |
| 2,650,504 | 9/1953 | Tateishi | 274—9.1 |
| 2,670,210 | 2/1954 | Thompson | 274—2 |
| 2,712,942 | 7/1955 | Smits | 274—14 |
| 2,905,475 | 9/1959 | Cheeseboro | 274—9 |
| 2,927,794 | 4/1960 | Carson | 274—9 |
| 2,939,713 | 6/1960 | Winter | 274—9 |
| 2,943,861 | 7/1960 | Redfield | 274—9 |
| 2,955,826 | 10/1960 | Vistain | 274—9 |
| 3,004,764 | 10/1961 | Staar | 274—14 |

LOUIS J. CAPOZI, *Primary Examiner.*

ANTONIA F. GUIDA, *Examiner.*